Aug. 20, 1935.  E. C. BLISS  2,011,841
WIRELESS CORN PLANTER
Filed Feb. 3, 1933    2 Sheets-Sheet 1
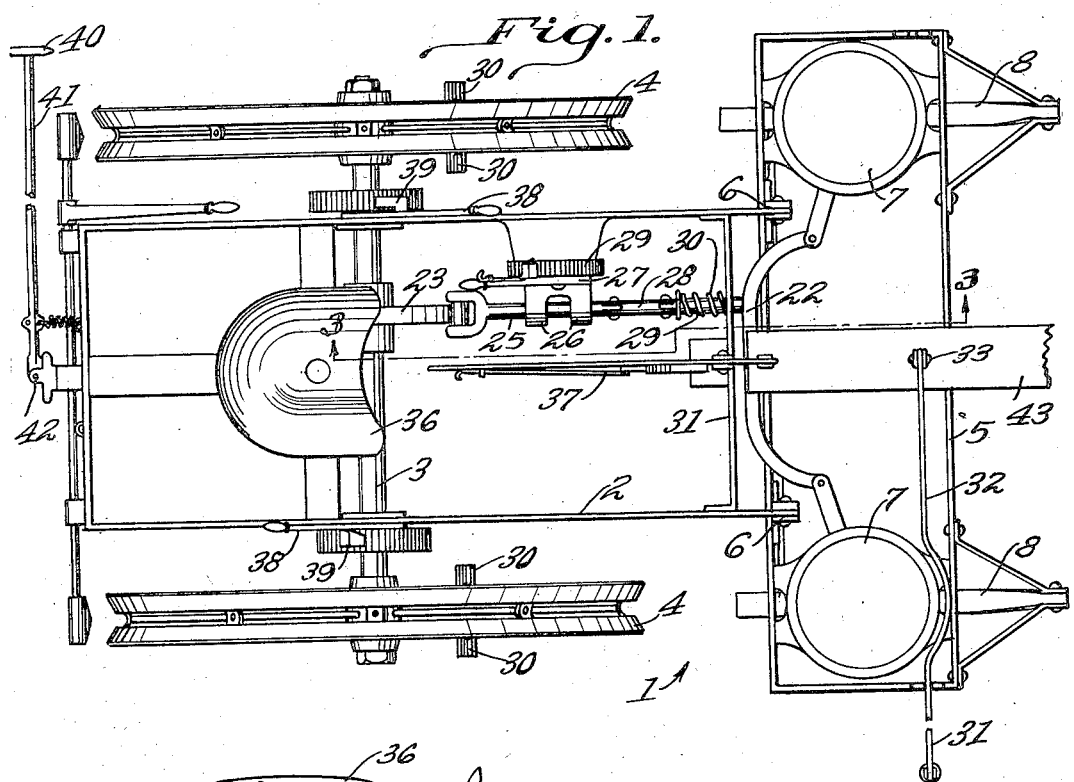
Inventor
E. C. Bliss Aug. 20, 1935. E. C. BLISS 2,011,841
WIRELESS CORN PLANTER
Filed Feb. 3, 1933 2 Sheets-Sheet 2
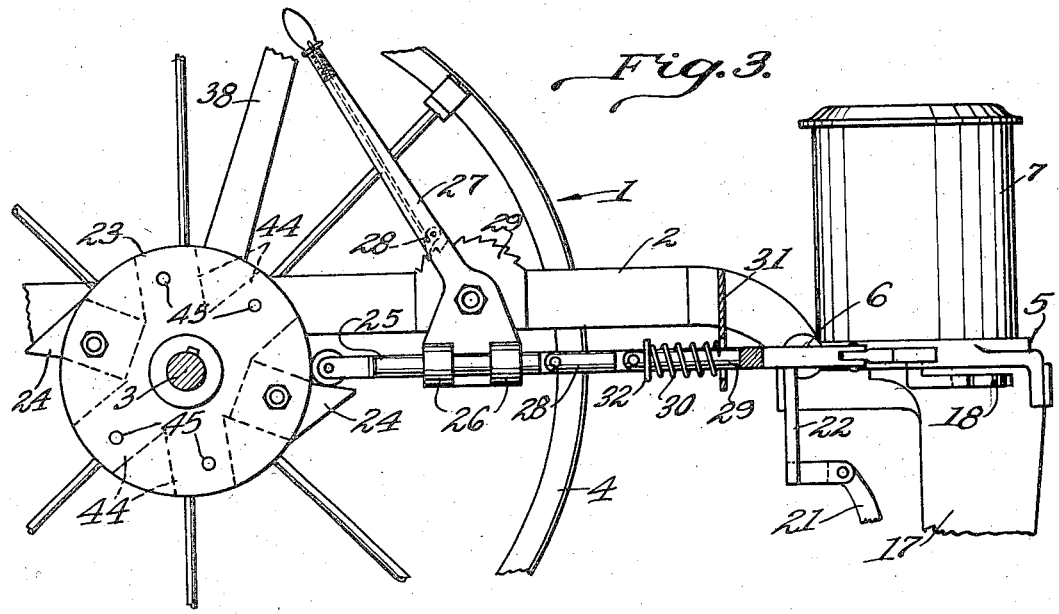
Inventor
E·C·Bliss
Attorney Patented Aug. 20, 1935

2,011,841

UNITED STATES PATENT OFFICE 2,011,841

WIRELESS CORN PLANTER

Edward C. Bliss, Beaver, Ohio

Application February 3, 1933, Serial No. 655,122

1 Claim. (Cl. 111—16)

This invention relates to corn planters and more particularly to that type of planters wherein the corn may be planted in hills at equal distances apart and without the necessity of employing a rope, chain, or wire stretched across the field to operate the seed dropping mechanism and effecting the checking of the rows.

An outstanding feature of the present invention is the employment of a plumb bob arranged laterally of and at the front of the planter and which together with hill markers operated by the planter is used as a guide to the dropping of the first hill in the next row after turning the planter or machine around preparatory to driving back across the field in the direction from which it had come. The hill markers which are arranged on each side of the planter are so operated as to make an indication for each seed hill dropped in the rows as the machine progresses across the field. The plumb bob can therefore be aligned with any of the marked hills of the previously planted adjacent row so as to accurately check, from time to time, the placing of the hills in the row being planted.

Other features will be apparent from the following description taken in connection with the accompanying drawings, wherein:

Fig. 1 is a top plan view of the improved planter comprising the present invention;

Fig. 2 is a side elevation thereof;

Fig. 3 is an enlarged detail vertical sectional view taken on the line 3—3 of Fig. 1;

Fig. 4 is a vertical sectional view taken through the lower portion of one of the seed hoppers;

Fig. 5 is a horizontal sectional view taken on the line 5—5 of Fig. 4;

Fig. 6 is a similar view taken on the line 6—6 of Fig. 4;

Fig. 7 is a detail view showing the construction and mounting of the plumb bob.

Referring more particularly to the drawings, the numeral 1 designates the planter in its entirety which is formed to comprise the usual supporting frame 2, the main driving axle 3 having wheels 4 attached thereto and a seed box supporting frame 5 pivotally connected as at 6 to the forward end of the frame 2. The frame 5 carries the customary seed boxes 7 with associated mechanism including the runners 8.

The seed dropping mechanism in connection with each of the hoppers 7 may be of any well known construction, and, for the purpose of illustration only, has been shown to include an arcuate seed carrying plate 9 mounted for movement within a similarly shaped slot 10 formed in the bottom 11 of the seed containing box or hopper 7. Arranged above the plate 9 is a wall 12 inclined so as to direct the seeds towards an opening 13 formed therein and which registers, when the plate 9 is at one end of the slot 10, with an opening 14 formed in the plate so that the seeds from the hopper may fall by gravity into said opening and carried by the movement of the plate to a discharge passage 15 formed in a closure 16 arranged at the upper end of the seed conducting tube 17.

Connected for movement with the plate 9 and disposed immediately below the discharge passage 15 is a shutter member 18 upon which the seeds from the plate 9 are deposited and held momentarily until the plate 9 again has been moved to a position receiving additional seeds, at which time the shutter 18 will uncover the passage or opening 15 and permit the seeds to drop downwardly into the tube 17 and be deposited upon a rocking gate 19 mounted at the lower end of the tube where the seeds will be held until ready to be dropped upon the ground by the operation of the gate. The gate 19 which is connected for movement with the plate 9 through a link 20, a lever 21 and a yoke 22 connecting the seed carrying plates is so timed as to drop the seeds within the furrow made by the runner 8 and close in time to receive the seeds discharged through the opening 15 and hold the same until the next hill is to be planted. The mechanism just described is more or less generally used and well understood in connection with devices of this kind and therefore more extensive description thereof is thought unnecessary.

To effect the operation and timing of the seed dropping mechanism, the driving axle 3 has keyed thereto a cam wheel 23 having cam lugs 24 carried thereby adapted for engagement with the roller carrying end of a slidable plunger 25 mounted for movement within a pair of spaced bearings 26 carried by the lower end of a pivoted lever structure 27. The forward end of the plunger 25 is pivotally connected to a link 28 which in turn is pivoted to one end of an extension 29 forming a part of the yoke 22 connecting the seed carrying plates 9. Received upon the extension 29 is a coil spring 30 which has one of its ends engaging a cross brace 31 attached to the frame 2 and which forms a bearing for said extension, whereas the other end of the spring engages a washer 32 or stop fixed to the extension 29. The purpose of the spring is to keep the plunger 25 into engagement with the cam wheel 23 and in position to be engaged by the cam lugs 24. It will be seen that upon the rotation of the cam wheel 23, the cam lugs 24 thereof will successively engage with the plunger 25 causing the same to be pushed forward against the action of the spring 30 and effect the operation of the seed dropping mechanism as will be readily understood.

Due to the provision of the lever 27 and the pivoted link 28, the plunger 25 may be rocked by said lever to a position free from engagement with the cam lugs 24 and arrest the movement of the seed dropping mechanism, which is desirable when the planter is turned around at the end of a row or driven to or from the field. The lever 27 is held in its position by the provision of a spring pressed latch engaging the teeth of a quadrant 29 rigidly carried by the frame structure 2 of the planter.

In order to mark the positions of the hills planted, the driving wheels 4 of the planter are equipped with spaced markers 30 which are attached to the outer periphery of the wheels and located diametrically opposite one another and in cooperative alignment with the cam lugs 24. As each of the markers 30 are arranged around the circumference of the wheel a distance apart equal to the distance between the centers of the wheels and the points where the seeds are dropped, which is also the distance between the rows, it follows that said markers will thus make indications a similar distance apart showing that the corn is planted in check row formation.

To accurately align the hills of the rows being planted with the hills of the preceding row or rows, the present invention provides for a plumb bob attachment 31 which comprises a bar or arm 32 hinged as at 33 in a longitudinal center of the planter at the forward end thereof and overlying the seed hopper frame 5. Attached to the outer end of the bar 32 for hinged movement therewith is a rod 34, having a plumb bob 35 secured to its lower end. The length of the bar 32 is such that the plumb bob 35 will overhang the adjacent row and is capable of being positioned immediately above the hills, but clearing the same.

In the operation of the planter and in turning the same around at the end of a pair of planted rows, with the view of proceeding back across the field, the plumb bob attachment 31 is swung on its pivot 33 to extend to the other side of the planter which will thus locate the plumb bob over the nearest row previously planted. The planter is now moved forward until the plumb bob 35 is positioned over the marked first hill of the row which is readily observed by the operator occupying the seat 36. The front frame carrying the seed dropping mechanism, which had previously to the turning of the planter been raised, is now lowered by means of the customary lever attachment 37 or its equivalent, commonly found in connection with devices of this kind, which will also effect the engagement of the runners 8 with the ground. If the markers 30 of the wheels should be in such positions as to be out of alignment with the indications of the previously planted rows, the operator may then slide the wheels around upon the ground by means of levers 38 until the nearest markers are placed correctly. The levers 38 are pivotally mounted upon the axle 3 and have engagement therewith by pawl and ratchet mechanisms 39. The ratchet teeth in connection with one of the levers are in a direction reversed from that of the other lever so that the wheels may be turned in either direction placing the nearest markers into contact with the ground. Moving the markers to correct positions will also place one of the cam lugs 24 in a position to operate the seed dropping mechanism thereby forming a hill in the row to be planted and at a point exactly in alignment with the position of the plumb bob or the previously planted hill registering therewith. The planter is now ready to be moved across the field with the seed dropping mechanisms so arranged as to accurately drop the seeds at regulated intervals and in registration with the previously planted hills.

Preferably, the planter is also provided with a furrow marker or runner 40 at its rearward end, by means of which the planter or machine may be driven in strictly parallel lines when in operation to secure parallelism of the planted rows. The furrow marker 40 which is carried at one end of a rod 41 and pivotally connected as at 42 to the rear of the planter in the longitudinal axis thereof may thus be swung to either side of the machine, as may be required.

From the foregoing, it will be seen that a planter has been provided in which several novel features have been incorporated. By the provision of the plumb bob attachment, the hills of rows to be planted may be accurately aligned with the hills of previously planted rows to cause the corn to be planted in check rows. The fact that the markers indicate each hill planted makes it possible to line up the plumb bob with any one of the previously planted hills throughout the length of the field which is highly desirable when trees, stones or other obstructions are in the way and which may alter the course of the planter. By the combination of the furrow marker, the hill markers and the plumb bob attachment, the hills may be aligned or checked with unusual accuracy in that by the position of the planter so that the tongue 43 thereof will be straight with the guiding line made by the furrow marker. The plumb bob will thus be positioned exactly over the adjacent planted row and when brought in position registration with a marked hill thereof, the planter will be so positioned as to plant the corn and mark the hills thereof in perfect alignment with the previously planted hills. The seed dropping operating mechanism including the cam wheel and the slidable plunger is also thought novel in that by the particular mounting of the latter, the same may be rocked to a position free from engagement with the lugs of the cam wheel by the simple operation of swinging a lever from one point to another. The cam wheel 23 is provided with a plurality of sockets 44 for the removable reception of additional cam lugs which are brought in operation when it is desired to drill or plant the corn at shorter distances apart. The additional cam lugs may be held in place by removable fastening elements such as bolts and the like arranged within openings 45 formed in the side walls of the sockets. The planter has the advantage of being simple in construction, involving comparatively few working parts which are easy to operate and keep in working order.

Although I have shown what I consider to be a specific embodiment of the invention, it will be understood that slight changes may be made in the mechanism from time to time without departing from the spirit and scope of the invention as set forth in the appended claim.

What is claimed is:

A check-row planter comprising a main frame, an axle rotatably carried by said frame, driving wheels rigidly secured to said axle, hill markers provided on said driving wheels, seed dropping mechanism driven by said axle, manual means for disconnecting said dropping mechanism from driving engagement with said axle, a plumb bob carried by the forward end of said planter for alignment with the hill marks of an adjacent row and manual means for rotating said driving wheels to set said hill markers when said plumb bob is in alignment with said adjacent hill.

EDWARD C. BLISS.